United States Patent [19]
Kizilos

[11] 3,752,401
[45] Aug. 14, 1973

[54] CONTROL APPARATUS

[75] Inventor: Apostolos P. Kizilos, Minnetonka, Minn.

[73] Assignee: Honeywell Inc., Minneapolis, Minn.

[22] Filed: Dec. 23, 1968

[21] Appl. No.: 786,301

[52] U.S. Cl............ 239/265.35, 60/228, 60/230, 239/543, 244/42 CD, 239/265.11, 239/265.23
[51] Int. Cl............................................ B64c 15/04
[58] Field of Search................... 244/3.22, 42 CD, 244/42 CC, 42 R; 239/265.35, 266.19, 265.11, 265.23, 543; 60/228, 230

[56] References Cited
UNITED STATES PATENTS

| 3,062,483 | 11/1962 | Davidson | 239/543 |
| 3,066,894 | 12/1962 | Davidson | 239/543 |
| 3,109,494 | 11/1963 | Davidson | 244/42 CC |
| 3,367,581 | 2/1968 | Hilzilos et al. | 239/543 |
| 2,995,317 | 8/1961 | Schoppe | 60/228 |
| 3,255,971 | 6/1966 | Widell | 239/265.23 |
| 3,302,888 | 2/1967 | Holmes et al. | 60/263 |

*Primary Examiner*—Samuel Feinberg
*Attorney*—Charles J. Ungemach, Ronald T. Reiling and Charles L. Rubow

[57] ABSTRACT

A three-dimensional variable deflection thruster for varying the direction of a fluid stream about two mutually orthogonal axes, having no moving parts. A plurality of fluid streams are caused to attach to and flow around a convex three-dimensional surface to impinge on one another and form a resultant fluid stream. The resultant fluid stream departs from the convex surface in a direction which can be controlled by varying the relative strengths and directions of the component fluid streams.

4 Claims, 4 Drawing Figures

INVENTOR.
APOSTOLOS P. KIZILOS
BY Ronald T. Reiling
ATTORNEY

Patented Aug. 14, 1973

INVENTOR.
APOSTOLOS P. KIZILOS
BY Ronald T. Reiling
ATTORNEY 3,752,401

CONTROL APPARATUS

BACKGROUND OF THE INVENTION

This invention relates generally to fluid control systems.

In fluid control systems it is often desirable to control the direction of fluid fluid stream. In rocket powered vehicles it is often necessary to vary the direction of fluid rocket exhaust as a means for controlling the direction of the vehicle. In these and other applications it is desirable to have a control device for controlling the direction of a fluid stream that is simple, rugged, inexpensive and has fast response.

The prior art includes devices for controlling the direction of a fluid stream, but each of these devices is subject to certain limitations.

It is known in the art that if two fluid streams are caused to attach to a cylindrical member and to flow therearound in opposite directions so as to impinge on one another, then a resulting stream will be formed which departs from the surface in a direction determined by the strength of the two fluid streams. Thus, directional control of the resultant fluid stream can be effected. While this device has the advantage of requiring no moving parts, and hence having higher reliability, it is inherently limited to deflections of the resultant stream in one plane only. This restriction severly limits its usefulness in control systems, and makes it unacceptable for use in rocket control, where deflections about two axes is required to control the rocket.

Another prior art device used to control the direction of a fluid stream comprises a single nozzle which is mounted on pivots or gimbals. If gimbaled on two axes, the nozzle can provide for deflection of the fluid stream about two axes, but these devices suffer from high cost, low reliability and slow response associated with mechanical assemblies having moving parts.

SUMMARY OF THE INVENTION

The applicant's invention provides a device for issuing a fluid stream into an ambient fluid, and a fluid control circuit for controlling the momentum of the fluid stream so issued and for varying its direction three dimensionally.

The applicant's invention comprises a member having a convex three-dimensional surface, fluid outlet means contiguous to the surface, and control means for varying the fluid flow from each of the outlets.

Fluid streams issuing from the outlets attach to the convex surface and flow therearound. The outlets are positioned around the convex surface so as to cause the fluid streams flowing around the convex surface to impinge on one another, and to combine to form a resultant fluid stream which departs from the surface. The direction that the resultant stream assumes after departing from the surface is determined by the relative momenta of the component fluid streams and the direction of the respective paths they follow around the convex surface. The control means used in applicant's invention are operable to control the momentum of each of the fluid streams issuing from the fluid outlets, and the direction of the paths they follow around the convex surface.

In accordance with the teachings of this invention, a fluid stream may be issued to flow through an ambient fluid. In addition, the momentum of the fluid stream may be controlled, and its direction may be varied simultaneously about two mutually orthogonal axes. Further, this result is effected solely by controlling the fluid flow from the fluid outlets, and without the use of moving parts.

DESCRIPTION OF THE PREFERRED EMBODIMENTS

Figure 1:
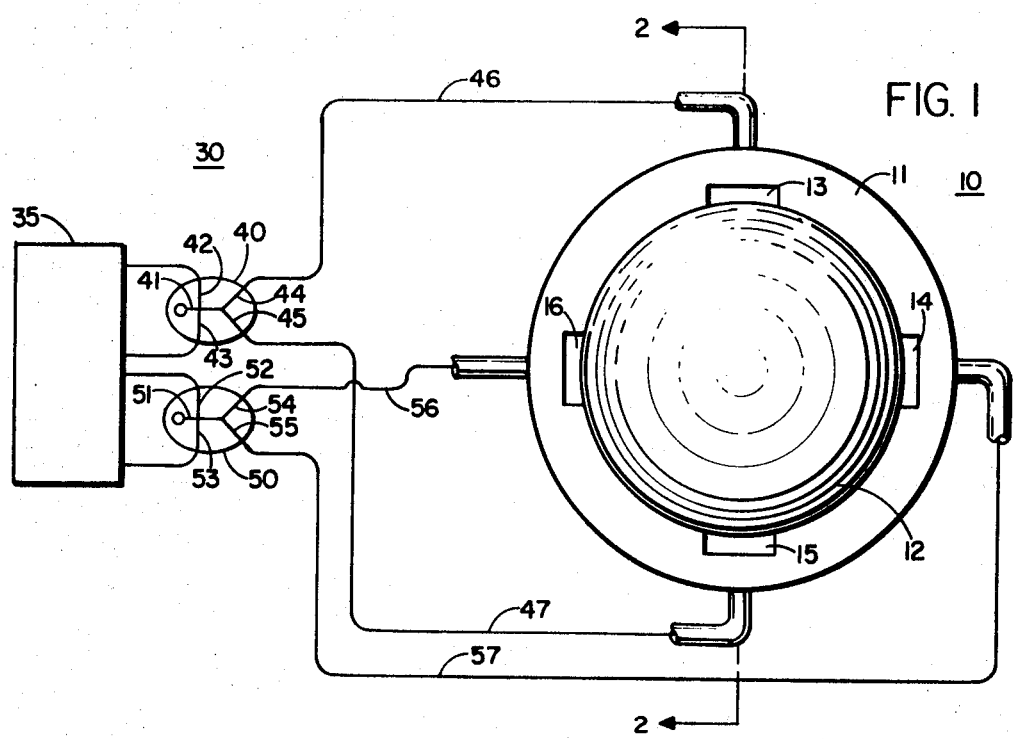
FIG. 1 is a partial schematic drawing of one embodiment of the applicant's invention.
Figure 2:
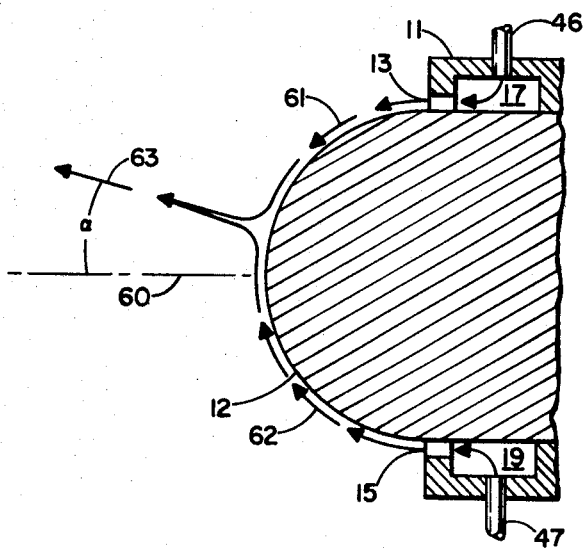
FIG. 2 is a cross-sectional view taken along lines 2—2 of FIG. 1.

The embodiment of applicant's invention shown in FIGS. 1 and 2 comprises fluid stream director 10 and fluid control circuit 30. Fluid stream director 10 includes a housing 11, and a member having a surface 12. Elements 11 and 12 may be made of any suitable material such as metal or plastic that is substantially rigid, impervious to fluids, and not subject to corrosion by fluids in contact therewith. In this embodiment surface 12 is shown as being hemispherical in shape, but it need not be so limited. In general, surface 12 may take the shape of any member of the class of convex three-dimensional surfaces. The class of convex three-dimensional surfaces includes hemispheres, paraboloids, elipsoids, covex surfaces of revolution, pyramids and tetrahedrons whether truncated or not, and those irregular or asymmetrical surfaces which are generally convex with respect to an axis.

Located in housing 11 are fluid outlets 13, 14, 15 and 16, which in this embodiment are positioned in quadrature around surface 12. Also in housing 11 and communicating respectively with fluid outlets 13, 14, 15 and 16, are plenum chambers 17 (shown in FIG. 2), 18 (not shown), 19 (FIG. 2) and 20 (not shown).

Fluid is supplied to the fluid outlets by fluid control circuit 30 which comprises signal source 35, fluid amplifiers 40 and 50, and conduits 46, 47, 56 and 57. Signal source 35 is connected to control ports 42 and 43 of fluid amplifier 40, and control ports 52 and 53 of fluid amplifier 50. Signal source 35 may be any suitable means such as a pressure differential valve for supplying pressure differential signals to the control ports of the fluid amplifiers. Fluid at a working pressure is applied to fluid amplifier power nozzles 41 and 51 by fluid supply source which is not shown. Fluid amplifier output passage 44 is connected to plenum chamber 17 and fluid outlet 13 by conduit 46. Output passage 45 is connected to plenum chamber 19 and fluid outlet 15 by conduit 47. Output passage 54 is connected to plenum chamber 20 and fluid outlet 16 by conduit 56. Output passage 55 is connected to plenum chamber 18 and fluid outlet 14 by conduit 57.

The operation of this embodiment of applicant's invention will now be explained with reference to FIGS. 1 and 2. In the absence of pressure differential signals from signal source 35, the power streams from power nozzles 41 and 51 are equally divided between output passages 44 and 45, and between 54 and 55 respectively. Thus, fluid is supplied to each of plenum chambers 17–20 at equal pressures, causing fluid streams of equal momentum to issue from fluid outlets 13 through 16. The paths that the fluid streams follow may be understood by reference to FIG. 2. Fluid stream 61, which issues from fluid outlet 13, attaches to and flows around surface 12 due to the Coanda effect. Because of its velocity, fluid stream 61 entrains flow from the ambient fluid. This causes depletion of the ambient fluid and therefore low pressure in an area between fluid stream 61 and surface 12. This low pressure, together with the ambient pressure on the other side of fluid stream 61 is sufficient to cause attachment. In like manner, fluid stream 62 issuing from fluid outlet 15 attaches to and flows around surface 12 to impinge upon fluid stream 61 and combine to form a resultant fluid stream 63 which departs from surface 12 at an angle $\alpha$ relative to axis 60. The magnitude of angle $\alpha$ is determined by the relative momenta of fluid streams 61 and 62. That is, by varying the relative momenta of the fluid streams 61 and 62, the direction of resultant fluid stream 63 may be varied through the angle $\alpha$, which lies in the plane of FIG. 2.

The relative momenta of fluid streams 61 and 62 is controlled by the relative pressures in plenum chambers 17 and 19 which in turn are controlled by the relative flow through output passages 44 and 45 of fluid amplifier 40. The relative flow through output passages 44 and 45 is determined by the differential pressure applied across control ports 42 and 43 which is effective to control the direction of resultant fluid stream 63 about an axis normal to the plane of FIG. 2.

In similar manner, fluid streams issuing from fluid outlets 14 and 16 attach to and flow around surface 12. Likewise, the relative momenta of these fluid streams (not shown) is controlled by the pressure differential signal from signal source 35 applied to control ports 52 and 53 of fluid amplifier 50. Therefore, by simultaneously varying the pressure differential signals applied to control ports 42 and 43, and to 52 and 53, the direction of resultant fluid stream 63 is varied about two mutually perpendicular axes.

Applicant's invention as shown in FIGS. 1 and 2 thus provides an all fluidic method of directing a fluid stream. However, the embodiment of FIGS. 1 and 2 works best if the angle through which the resultant stream may be deflected is small, because it is necessary that all four fluid streams impinge on one another within a certain area on surface 12. Too great a momentum difference between one pair of fluid streams would tend to move their point of impingement too far along surface 12, and out of alignment with the fluid streams from the other pair of fluid outlets.

However, large deflections of the resulting fluid stream may be obtained if additional valve means are included so that only one pair of opposing fluid outlets is operable at a time. Thus modified, the applicant's invention would be useful for example, to control the pitch or yaw axes of a missile alternately, but not simultaneously.

Figure 3:
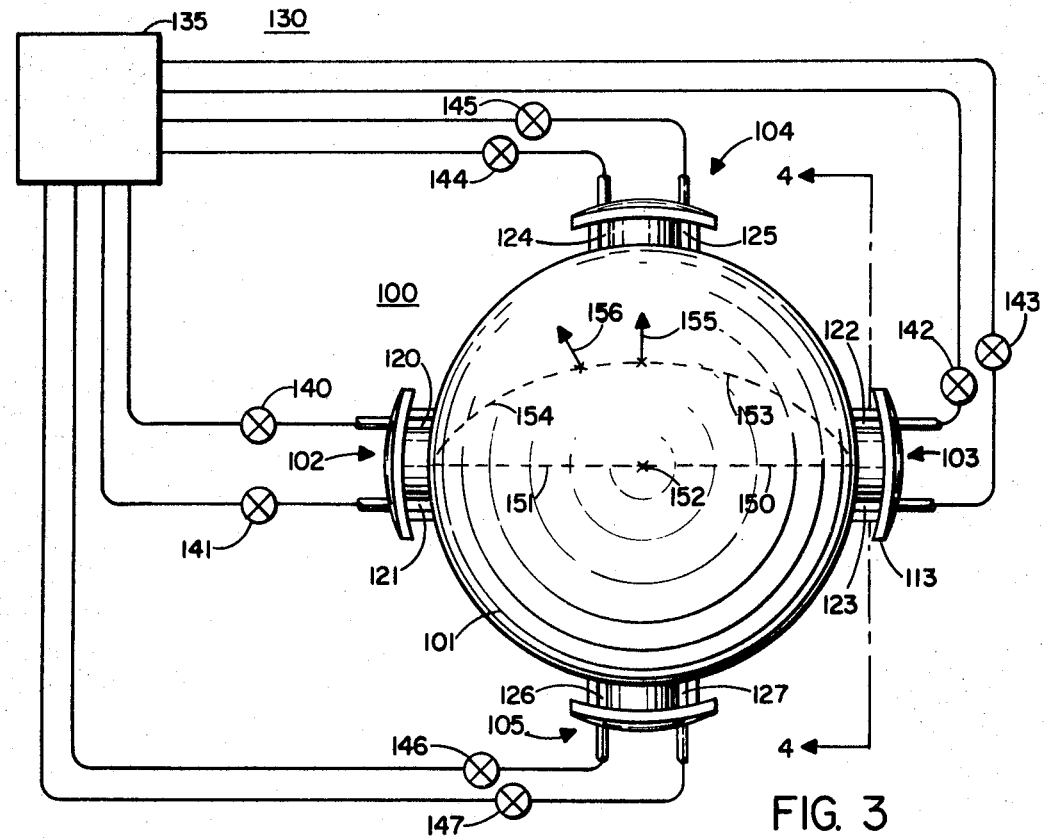
FIG. 3 is a partial schematic drawing of a second embodiment of applicant's invention.
Figure 4:
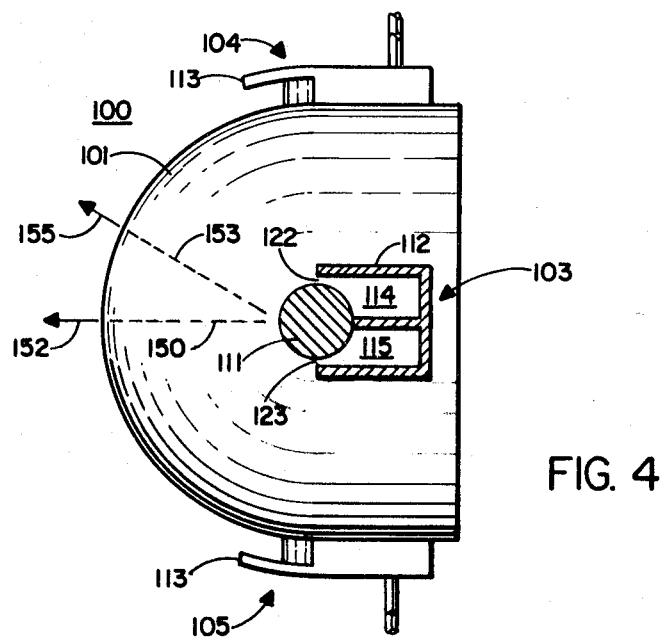
FIG. 4 is a cross-sectional view taken along lines 4—4 of FIG. 3.

A second embodiment of the applicant's invention which provides large deflection angles is shown in FIGS. 3 and 4. Reference numeral 100 generally refers to the fluid stream director and reference numeral 130 generally refers to the fluid control circuit. Fluid stream director 100 comprises a member having a surface 101 and fluid outlet assemblies 102, 103, 104 and 105 positioned in quadrature therearound. Only one opposing pair of the fluid outlet assemblies is required for the operation of applicant's invention, but improved performance can be obtained through the use of all four fluid outlet assemblies, as will be explained hereinafter.

Surface 101 is shown having a hemispherical shape. However, surface 101 may be any symmetrical convex three-dimensional surface. That is, surface 101 may be any convex surface of revolution. Each fluid outlet assembly is identical to fluid outlet assembly 103, which is shown in cross-section in FIG. 4. Fluid outlet assembly 103 comprises cylindrical member 111, wall member 112, cap 113 (shown in FIG. 3), and plenum chambers 114 and 115. Plenum chambers 114 and 115 of fluid outlet assembly 103 communicate respectively with fluid outlets 122 and 123. In similar manner, fluid outlets 120 and 121 are associated with fluid outlet assembly 102. Likewise, fluid outlets 124 and 125 are associated with fluid outlet assembly 104, and fluid outlets 126 and 127 are associated with fluid outlet assembly 105.

Caps 113 of fluid outlet assemblies 102–105 each have two ports (not shown) for connection with fluid conduits whereby fluid may be supplied to plenum chambers 114 and 115. Fluid source 135 supplies fluid to the fluid outlets through conduits and valves, as follows: valves 140 and 141 control the flow from fluid outlets 120 and 121 respectively. Likewise, valves 142 and 143 control the flow from fluid outlets 122 and 123, respectively. In similar manner, valves 144, 145, 146 and 147 control the flow from fluid outlets 124, 125, 126 and 127 respectively.

The simplest mode of operation of applicant's invention which is shown in FIGS. 3 and 4 requires the use of only one opposing pair of fluid outlet assemblies. The operation of each fluid outlet assembly is similar to the operation of the first embodiment of applicant's fluid stream director as described with reference to FIG. 2. For purposes of explanation, assume that only fluid outlet assemblies 102 and 103 are operative. Fluid at a pressure is introduced into plenum chambers 114 and 115 of fluid outlet assembly 103 through conduits and valves 142 and 143 causing fluid streams to issue from fluid outlets 122 and 123. Due to the Coanda effect, fluid streams issuing from fluid outlets 122 and 123 attach to cylindrical member 111 and flow therearound to impinge on one another and combine to form a resultant fluid stream which departs from the surface of cylindrical member 111. This resultant fluid stream from fluid outlet assembly 103 has an initial velocity substantially tangent to surface 101 at the point of departure from cylindrical member 111. Again, due to the Coanda effect, the resultant stream attaches to and flows around surface 101. The path that the resultant stream follows around surface 101 depends upon the initial direction of the resultant stream as it departs from the surface of the cylindrical member 111, which in turn depends on the relative momenta of the fluid streams issuing from fluid outlets 122 and 123. Thus, by controlling the pressures in plenum chambers 114 and 115, the path of the resultant stream around surface 101 can be controlled.

The operation of fluid outlet assembly 102 is identical to the operation of fluid outlet assembly 103, which has already been described. The result of the operation of fluid outlet assembly 102 is that a second resultant stream is caused to flow around surface 101, in the opposite direction from the first resultant fluid stream. If the paths followed by the first and second resultant fluid streams intersect, the streams impinge on one another and combine to form a third resultant fluid stream which will depart from surface 101. The direction of the third resultant fluid stream depends upon the relative momenta of the first and second resultant fluid streams.

For example, assume that valves 140, 141, 142 and 143 are adjusted to deliver equal pressures to plenum chambers 114 and 115 of fluid outlet assembly 102, and to plenum chambers 114 and 115 of fluid outlet assembly 103. The first resultant stream from fluid outlet assembly 103 will depart from cylindrical member 111 and will follow path 150 around surface 101. Likewise, the second resultant stream from fluid outlet assembly 102 will depart from cylindrical member 111 and follow path 151 around the surface 101. The first and second resultant streams will impinge on one another and combine to form a third resultant stream which will depart from surface 101 along path 152 which is approximately perpendicular to the plane of FIG. 3.

If valves 141 and 143 are now adjusted so as to increase the pressure in plenum chambers 115 of fluid outlet assemblies 102 and 103, the first and second resultant streams will follow paths 153 and 154 respectively. It will be appreciated that since surface 101 is hemispherical and since fluid outlet assemblies 102 and 103 are mounted substantially on a diameter thereof, paths 153 and 154 are parts of the same great circle of the hemisphere. Therefore, the first and second resultant streams will impinge and combine to form a third resultant stream which will depart from surface 101 along path 155 outward and slightly upward from the plane of FIG. 3. In this embodiment of applicant's invention, the third resultant fluid stream always departs approximately perpendicular to surface 101 at the point of departure.

If, now, valves 142 and 143 are adjusted to increase the pressures in plenum chambers 114 and 115 of the fluid outlet assembly 103 by a proportionate amount, the first resultant stream will continue to follow path 153, but will have a higher momentum than before. This will cause the point of impingement of the first and second resultant streams to shift closer to fluid outlet assembly 102, and the third resultant stream will now follow path 156.

Improved performance may be obtained through the use of all four fluid outlet assemblies 102-105. For example, valves 144, 145, 146 and 147 may be so adjusted that resultant streams impinge on one another at the same point, which gives more momentum and better definition to the final resultant stream.

It will be appreciated that the valves shown in FIG. 3 could be mechanical, electro-mechanical, or fluidic without substantially changing the scope of applicant's invention.

I claim as my invention:

1. In combination;
a fluid stream director comprising:
   a first member having a first cylindrical surface;
   means adjacent to said first cylindrical surface for supplying first and second fluid streams for attachment thereto, said first and second fluid streams flowing around said first cylindrical surface to impinge at a point thereon and form a first resultant stream which departs therefrom;
   a member having a convex surface of revolution;
   means for positioning said first cylindrical surface contiguous to said convex surface so that said first resultant stream attaches to said convex surface;
   a second member having a second cylindrical surface;
   means adjacent to said second cylindrical surface for supplying third and fourth fluid streams for attachment thereto, said third and fourth fluid streams flowing around said second cylindrical surface to impinge at a point thereon and form a second resultant stream which departs therefrom;
   means for positioning said second cylindrical surface contiguous to said convex surface in a diametrically opposed relationship to said first cylindrical surface, so that said second resultant stream attaches to said convex surface, said first and said second resultant streams flowing in paths around said convex surface to impinge at a point thereon and to form a third resultant stream which departs therefrom; and,
a fluid control circuit comprising;
   first control means operable to vary the relative momenta of said first and second fluid streams, thereby varying the position of the point of impingement on said first cylindrical surface which is effective to vary the path of the first resultant stream around said convex surface, said first control means further operable to vary the total momentum of said first and second fluid streams; and
   second control means operable to vary the relative momenta of said third and fourth fluid streams thereby varying the position of the point of impingement on said second cylindrical surface which is effective to vary the path of the second resultant stream around said convex surface, said second control means further operable to vary the total momentum of said third and fourth fluid streams, thereby varying the position of the point of impingement of the first and second resultant streams on said convex surface.

2. Apparatus of claim 1 wherein said convex surface of revolution is a hemisphere.

3. Apparatus of claim 1 wherein said first and said second cylindrical members are circular in cross section.

4. Apparatus of claim 1 further including:
third and fourth members having third and fourth cylindrical surfaces respectively;
means adjacent to said third cylindrical surface for supplying fifth and sixth fluid streams for attachment thereto, said fifth and sixth fluid streams flowing around said third cylindrical surface to impinge at a point thereon and form a fourth resultant stream which departs therefrom;
means for positioning said third cylindrical surface contiguous to said convex surface so that said fourth resultant stream attaches to said convex surface;
means adjacent to said fourth cylindrical surface for supplying seventh and eighth fluid streams for attachment thereto, said seventh and eighth fluid streams flowing around said fourth cylindrical surface to impinge at a point thereon and form a fifth resultant stream which departs therefrom;

means for positioning said fourth cylindrical surface contiguous to said convex surface in a diametrically opposed relationship to said third cylindrical surface, so that said fifth resultant stream attaches to said convex surface, said fourth and said fifth resultant streams flowing in paths around said convex surface to impinge on one another and on said first and said second resultant streams whereby said fourth and said fifth resultant streams contribute to said third resultant stream;

third control means operable to vary the relative momenta of said fifth and sixth fluid streams, thereby varying the position of the point of impingement on said third cylindrical surface which is effective to vary the path of the fourth resultant stream around said convex surface, said third control means further operable to vary the total momentum of said fifth and sixth fluid streams; and fourth control means operable to vary the relative momenta of said seventh and eighth fluid streams thereby varying the position of the point of impingement on said fourth cylindrical surface which is effective to vary the path of the fifth resultant stream around said convex surface, said fourth control means further operable to vary the total momenta of said seventh and eighth fluid streams, whereby to vary the position of said point of impingement on said convex surface.

* * * * *